Oct. 14, 1958 E. STANTON 2,855,703
ORAL ALPHABET AND WORD TEACHING MACHINE
Filed April 5, 1957 2 Sheets-Sheet 1
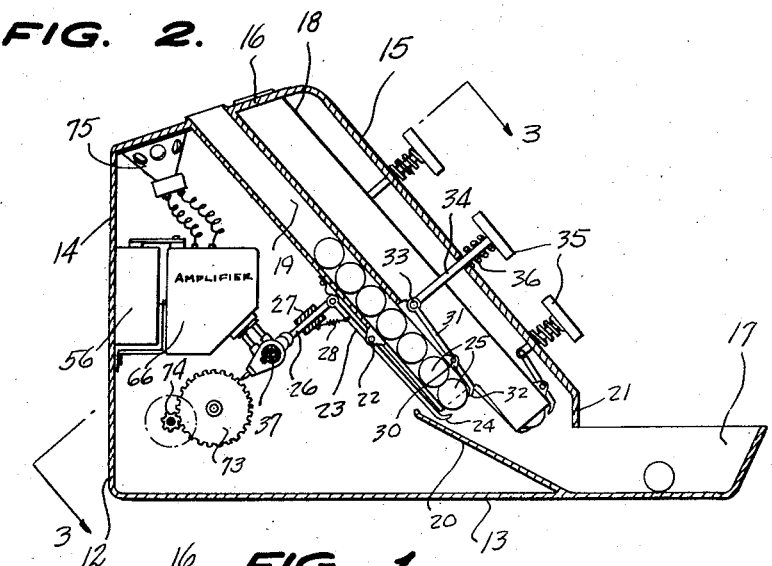
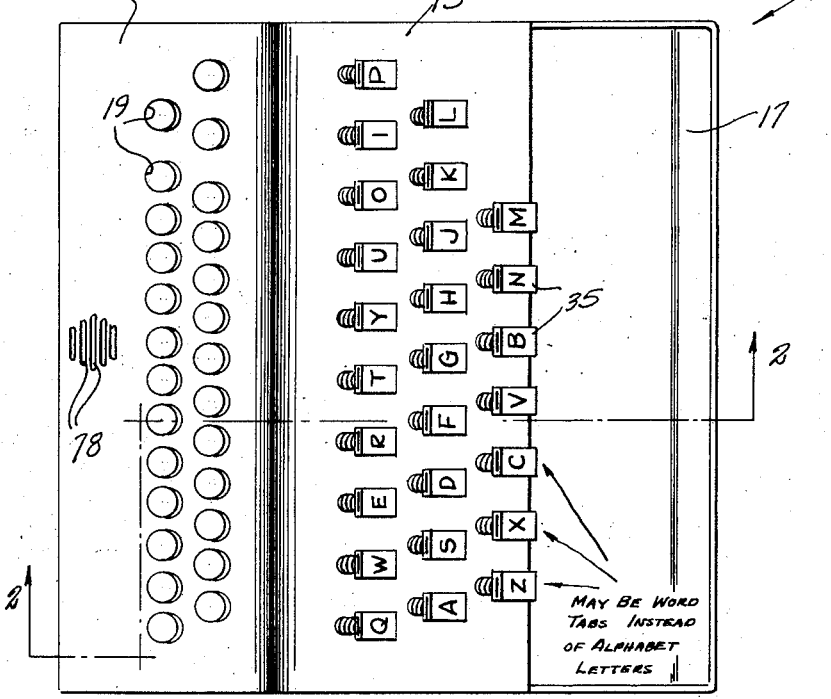
INVENTOR.
ELBERT STANTON,
BY
McMorrow, Berman & Davidson
ATTORNEYS.

Oct. 14, 1958 E. STANTON 2,855,703
ORAL ALPHABET AND WORD TEACHING MACHINE
Filed April 5, 1957 2 Sheets-Sheet 2
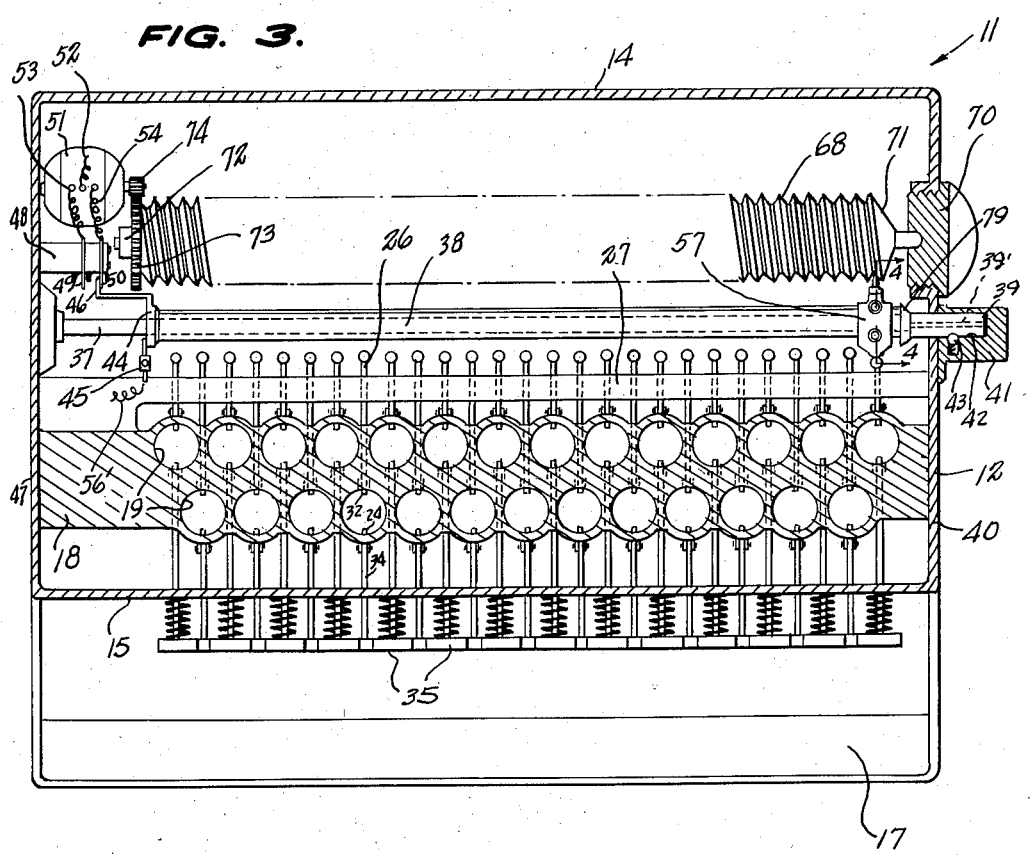
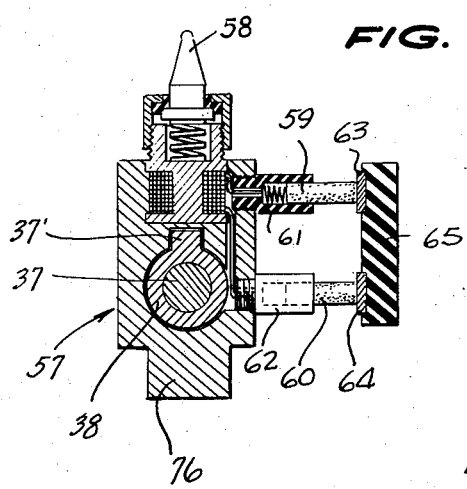
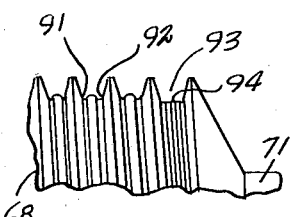
INVENTOR.
ELBERT STANTON,
BY
McMorrow, Berman & Davidson
ATTORNEYS.

United States Patent Office 2,855,703
Patented Oct. 14, 1958

2,855,703

ORAL ALPHABET AND WORD TEACHING MACHINE

Elbert Stanton, Detroit, Mich.

Application April 5, 1957, Serial No. 650,935

5 Claims. (Cl. 35—35)

This invention relates to educational devices, and more particularly to a machine for instructing children in the recognition of the letters of the alphabet and of simple words.

A main object of the invention is to provide a novel and improved educational device for teaching the alphabet and simple words, said device being simple in construction, being easy to operate, and being stimulating to the persons using same and facilitating their recognition of the various letters of the alphabet and of basic words.

A further object of the invention is to provide an improved oral alphabet and word teaching device which is of the keyboard type and which has in association therewith a sound reproducing mechanism arranged to provide audible signals in the form of spoken alphabetical letters or simple words, whereby a child or other student using the device may operate the keyboard so as to depress a keyboard element bearing the associated alphabetical letter or word, the apparatus being responsive to the correct matching of the audible signal and the depressed keyboard element to discharge a ball of candy or other reward from the machine under these conditions.

A still further object of the invention is to provide an improved electrically operated oral alphabet and word teaching machine which is relatively inexpensive to manufacture, which is sturdy in construction and which is automatically self-reversing so as to provide a series of successive audible signals comprising the various alphabetical letters or basic words and which may be therefore operated by a child or other student over long periods of time without requiring any adjustment or other mechanical attention.

Further objects and advantages of the invention will become apparent from the following description and claims, and from the accompanying drawings, wherein:

Figure 1 is a top view of an improved oral alphabet and word teaching machine constructed in accordance with the present invention.

Figure 2 is a vertical cross sectional view taken on the line 2—2 of Figure 1.

Figure 3 is an enlarged cross sectional view taken on the line 3—3 of Figure 2.

Figure 4 is an enlarged cross sectional detail view taken on the line 4—4 of Figure 3.

Figure 5 is an enlarged fragmentary elevational view of one end portion of a cylindrical phonograph record for use in the teaching device of the present invention.

Referring to the drawings, the alphabet and word teaching device is designated generally at 11 and comprises a main support in the form of a housing 12 having a bottom wall 13, a vertical rear wall 14, a downwardly and forwardly inclined top wall section 15, a downwardly and rearwardly inclined additional top wall section 16 merging with the forward top wall section 15, as is clearly shown in Figure 2, and formed at its forward portion with a trough 17. Rigidly secured in the housing 12 parallel to the forward top wall section 15 is a block member 18 formed with a plurality of downwardly and forwardly inclined cylindrical chutes 19 arranged parallel to the downwardly and forwardly inclined forward top wall section 15, as shown in Figure 2, the chutes being staggered in the manner illustrated in Figure 3 and being open at their top ends. The lower ends of the chutes open adjacent a downwardly and forwardly inclined guide plate 20 extending to the trough 17, as shown in Figure 2, whereby candy balls or other round objects, such as marbles, or the like, in the chutes 19 may descend by gravity into the trough 17 when released, as will be presently described. As shown in Figure 2, the trough 17 is open over its major area, and is thus freely accessible from the forward side of the machine. The upper forward wall portion 15 is provided at its forward end with a vertical depending section 21 which is disposed over the rear portion of the trough 17, as is clearly shown in Figure 2, but which is spaced sufficiently from the bottom wall 13 to allow the round candy balls or other spherical objects discharged from the chutes 19 to pass freely into the trough 17.

Associated with each chute 19 and pivoted to the body 18 below each chute, as shown at 22, is a lever member 23 formed at its forward end with an upwardly projecting stop lug 24 normally obstructing the open forward end of the chute and preventing discharge therefrom of the round candy balls 25, or other spherical objects in the chute. Pivoted to the inner end of each lever 23 is a follower rod 26 which extends slidably through a stationary guide bar 27 secured horizontally in the housing 12 and guiding the rod 26 for reciprocatory movement responsive to rotation of the associated lever 23. The lever is biased counter-clockwise, as viewed in Figure 2, in any suitable manner, for example, by a biasing spring 28 connecting the inner end portion of the lever to the stationary guide bar 27.

Pivoted to the body 18 above each chute 19, as shown at 30, is another lever 31 formed at its forward end with a stop lug 32 adapted to obstruct the open forward end of the chute and to prevent free discharge therefrom of the balls 25. Pivoted to the upper end of each lever 31, as shown at 33, is a key shaft 34 which extends slidably through the inclined top wall portion 15 and which is provided on its top end with a key tab 35 bearing an alphabetical letter or a simple word. A coiled spring 36 surrounds the upper portion of each shank 34, bearing between the top wall portion 15 and the associated key tab 35, biasing the tab upwardly and biasing the lever 31 clockwise, as viewed in Figure 2, namely, to bring its stop lug 32 into obstructing position with respect to the forward end of the associated chute 19.

As will be understood, the chute 19 becomes unobstructed only when both of the associated stop lugs 24 and 32 are moved away from the open forward end of the chute, namely, when the associated lever 23 is rotated clockwise, and the corresponding lever 31 is rotated counter-clockwise, as viewed in Figure 2. Therefore, discharge of the ball members 25 can only occur when simultaneous rotation of the levers 23 and 31 is accomplished.

The downwardly and rearwardly inclined rods 26, associated with the various levers 23 extend slidably through the stationary guide bar 27 and lie in the same downwardly and rearwardly inclined plane. Designated at 37 is a horizontal guide rod which is fixedly mounted in the housing 12 parallel to the bar 27 and in the same plane as the follower rod 26, being located rearwardly and below the ends of the follower rods. Slidably mounted on the rod 37 is a sleeve member 38 which is provided at its end with a shaft portion 39 extending through a side wall 40 of the housing 14 and slidably engaged in a socket 41. The shaft portion 39 is formed with a pair of spaced detent recesses 42 and the socket 41 is provided with a spring-pressed ball detent 43 adapted to be selectively engaged in either of the two recesses 42, whereby the sleeve member 38 will be retained in either one of two longitudinally spaced positions. The sleeve member 38 is of insulating material, and secured to the end thereof opposite the shaft element 39 is a conductive bracket member 44 provided with a terminal 45 and with an offset contact lug 46. Mounted on the side wall 47 of housing 12, opposite the side wall 40, is an insulating bracket 48 carrying a pair of spaced contact arms 49 and 50 which are engageable by the offset contact lug 46 in the two respective positions of the sleeve member 38.

Mounted in the rear portion of housing 12 is an electric motor 51 of the reversible type, having respective windings for driving the motor in opposite directions, the windings having a common terminal wire 52 and respective additional terminal wires 53 and 54, associated with the reversing windings of the motor. Thus, when terminals 53 and 52 are simultaneously connected to a source of direct current, such as a battery, with the terminal wire 52 being connected to one pole of the source and the wire 53 being connected to the other pole, the motor will be energized in one direction, whereas the motor will be operated in the opposite direction when the wire 54 is connected in place of the wire 53.

Mounted in the housing 12 are the batteries 56, constituting a direct current source, the wire 52 being connected by a conductor, not shown, to one pole of the battery unit and the terminal 45 being connected, as by a wire 56' to the other terminal of the battery unit. In the position shown in Figure 3, the motor wire 54 will be connected to said other terminal of the battery unit through the contact member 46, whereas the opposite motor wire 53 will be connected to said other terminal of the battery unit when the sleeve member 38 is shifted from the position shown in Figure 3 toward the left until the ball detent 43 engages in the other detent recess 42 of shaft member 39.

Slidably mounted on the sleeve member 38 is a sound reproducing head 57 provided with the stylus 58, the reproducing head 57 being provided with a pair of terminal brushes 59 and 60 slidably mounted in suitable insulating sleeves 61 and 62, as shown in Figure 4, and biased outwardly towards engagement with a pair of contact bars 63 and 64 carried on an insulating bar 65 mounted on the bottom wall of an amplifier 66 secured rigidly in the rear portion of the housing 12, the conductor bars 63 and 64 being connected to the input terminals of the amplifier in any suitable manner.

The amplifier 66 is energized from the battery unit 56 through a suitable control switch, not shown, which also controls the energization of the motor 51.

Designated at 68 is a cylindrical phonograph record which is rotatably mounted in the housing 12 parallel to the shaft 37 and spaced rearwardly and downwardly therefrom so as to be engaged by the stylus 58 of the phonograph unit 57. The cylindrical phonograph record 68 is journaled at one end in a screw plug 70 threadedly engaged in the wall 40, as shown in Figure 3, the cylindrical record being provided with a stub shaft element 71 rotatably engaged in a bearing recess provided in the screw plug 70. At its other end the phonograph record is provided with a similar stub shaft which is rotatably supported in a suitable upstanding bearing bracket 72 secured to the bottom wall 13 of housing 12. Said other end is provided with a gear 73 which meshingly engages with a pinion 74 carried on the shaft of the motor 51, so that the cylindrical record 68 is drivingly coupled to the motor and is constantly driven thereby when the motor is energized.

The direction of the phonograph record 68 is reversed when the direction of the motor 51 is reversed, whereby the phonograph pickup unit 57 is returned from the left end of the record toward the right end automatically responsive to the engagement of the pickup unit 57 with the end bracket member 44 of sleeve 38. A collar element 79 is provided on the sleeve member 38 adjacent the shaft element 39, as shown in Figure 3, said collar element 79 being engageable by the pickup unit 57 when the pickup unit reaches the right end of the phonograph record, whereby to shift the sleeve member 38 to the position thereof shown in Figure 3.

As shown in Figure 5, the phonograph record 68 has a main helical groove 90 in which are impressed the side-by-side record grooves 91 and 92, respectively for forward and reverse rotation of the phonograph record. The ends 93 of the main groove 90 are flat, as shown at 94 in Figure 5, to enable the rounded tip of the stylus 58 to transfer from one of the record grooves 91 or 92 to the other when the phonograph record reverses its direction of rotation.

The record grooves have impressed thereon audible signals corresponding to the alphabet indicia, or word tabs carried on the various tabs 35, said signals being reproduced by the amplifier 66 and its associated loud speaker 75 when the rounded tip 58 of the pickup 57 engages the corresponding record grooves.

To change the words, a new phonograph record 68 may be placed in the machine, and corresponding new word tabs may be inserted on the faces of the keys 35. Said key faces may be provided with transparent holders, well known in the art, to receive the word tabs.

The upper end of the pickup unit 57 is provided with a cam projection 76 which is engageable successively with the follower rods 26 as the pickup unit travels along the sleeve 38 by the cooperation of the stylus 58 with the helical groove in the phonograph record 68. If the correct alphabetical letter or word tab 35 is depressed at the same time that a corresponding audible signal is given by the loud speaker 75, the associated follower rod 26 will be in engagement with the cam projection 76, whereby the lower lever 23 associated with the adjacent discharge chute 19 is rotated clockwise, and the upper lever 31 associated with said chute 19 is rotated counter-clockwise by the depression of its tab 35, releasing the balls 25 in the chute and allowing said balls to pass freely into the exposed trough 17. Thus, if a student presses the correct key tab 35 corresponding to an audible alphabetical letter or word emitted by the machine, the student is rewarded with a candy ball, or other object, such as a marble, previously provided in the associated discharge chute 19. Obviously this stimulates the student to improve his efforts by providing an incentive for correct association of a key tab with an oral rendition of an alphabetical letter or a word.

As shown in Figure 2, the loud speaker 75 is connected to the amplifier output and is mounted on the underside of the rear top wall portion 16, said top wall portion being provided with a plurality of slots 78 to allow free passage of air waves from the loud speaker 75 through the top wall portion 16.

In operation, the pickup unit 57 is moved from one end of the sleeve member 38 to the other by the cooperation of the stylus 58 with the helical groove on the phonograph record 68. As the stylus travels along the groove, by the rotation of the phonograph record, the pickup unit 57 is driven and provides signals corresponding to the various oral alphabetical letters or words impressed on the record. These letters or words are transmitted by the amplifier 66 to the loud speaker 75. The student attempts to match up the audible signals with the tabs 35, and when the student presses the correct tab, he is rewarded by a candy ball or other spherical object, as above explained. When the pickup unit 57 reaches the end of the sleeve 38, for example, the left end thereof, the unit 57 engages the bracket member 44, moving the sleeve 38 from the position thereof shown in Figure 3, to a position wherein the lug 46 engages the contact element 49, reversing the direction of the motor 51, whereby the same action is provided except that the pickup unit 57 travels from the left to the right, as viewed in Figure 3. When the unit 57 engages the collar 79, the sleeve 38 is again shifted, whereby the above described cycle is repeated. The machine will operate continuously, in the manner above described, until its main control switch is opened, deenergizing motor 15 and amplifier 66.

The sleeve member 38 is held against rotation on the shaft 37 in any suitable manner, as by the provision of a rib 39' on the shaft element 39 engaging in a keyway in the socket 41. Similarly, the pickup unit 57 is held against rotation relative to the sleeve 38 by the provision of a rib 37' on sleeve 38 engaging in a keyway in the pickup unit.

While a specific embodiment of an improved alphabet and word teaching device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an alphabet and word teaching device, a support, a cylindrical phonograph record rotatably mounted on said support and having a helical record groove impressed with sound recordings of alphabet letters or words, drive means formed and arranged to rotate said cylindrical record, a guide rod mounted parallel and adjacent to said record, a phonograph pickup member slidably mounted on said guide rod and having a stylus element engaged in the record groove, a plurality of keys movably mounted on said support, a plurality of inclined discharge chutes on said support, each chute being associated with a specific key, a pair of gate members pivotally mounted on the support adjacent each chute and having means normally obstructing the lower end of the chute, means operatively connecting one gate member of each chute to its associated key and being formed and arranged to move the gate member to non-obstructing position responsive to depression of the key, and cooperating means on the pickup member and the other gate members formed and arranged to move the other gate members respectively to non-obstructing positions when the stylus element is engaged in the portions of the record groove carrying the sound records associated with the alphabet letters or words associated with the respective discharge chutes.

2. In an alphabet and word teaching device, a support, a cylindrical record rotatably mounted on said support and having a helical record groove impressed with sound recordings of alphabet letters or words, a reversible electric motor drivingly connected to said cylindrical record, a source of current connected to said motor, a guide rod mounted parallel and adjacent to said record, a phonograph pickup member slidably mounted on said guide rod and having a stylus element engaged in the record groove, reversing switch means mounted on the respective end portions of said guide rod, said switch means being connected in circuit with said motor and source and being formed and arranged to be operated responsive to engagement of the pickup member therewith at the ends of the record, whereby to reverse the direction of rotation of the record, a plurality of keys movably mounted on said support, a plurality of inclined discharge chutes on said support, each chute being associated with a specific alphabet letter or word and key, a pair of gate members pivotally mounted on the support adjacent each chute and having means normally obstructing the lower end of the chute, means operatively connecting one gate member of each chute to its associated key and being formed and arranged to move the gate member to non-obstructing position responsive to depression of the key, and cooperating means on the pickup member and the other gate members formed and arranged to move the other gate members respectively to non-obstructing positions when the stylus element is engaged in the portions of the record groove carrying the sound records corresponding to the alphabet letters or words associated with the respective discharge chutes.

3. In an alphabet and word teaching device, a support, a cylindrical phonograph record rotatably mounted on said support and having a helical record groove impressed with sound recordings of various alphabet letters or words, a reversible electric motor drivingly connected to said cylindrical record, a source of current connected to said motor, a guide sleeve slidably mounted on said support parallel and adjacent to said record, a phonograph pickup member slidably mounted on said guide sleeve and having a stylus element engaged in the record groove, reversing switch means mounted on the respective end portions of said guide sleeve, said switch means being formed and arranged to reversibly connect the motor to said source and being operated responsive to engagement of the pickup member therewith at the respective ends of the record, whereby to reverse the direction of rotation of the record, a plurality of keys pivoted to said support, a plurality of inclined discharge chutes on said support aligned with the letter keys, each chute being associated with a specific alphabet letter or word and key, a pair of gate members pivotally mounted on the support adjacent each chute and having means normally obstructing the lower end of the chute, means operatively connecting one gate member of each chute to its associated key and being formed and arranged to move the gate member to non-obstructing position responsive to depression of the key, a cam element on the pickup member, and follower means on the other gate members cammingly engageable with said cam element and being formed and arranged to move the other gate members respectively to non-obstructing positions when the stylus element is engaged in the portions of the record groove carrying the sound records corresponding to the alphabet letters or words associated with the respective discharge chutes.

4. In an alphabet and word teaching device, a support, a cylindrical phonograph record rotatably mounted on said support and having a helical record groove impressed with sound recordings of various alphabet letters or words, a reversible electric motor drivingly connected to said cylindrical record, a source of current connected to said motor, a guide sleeve mounted on the support parallel and adjacent to said record, a phonograph pickup member slidingly mounted on said guide sleeve and having a stylus element engaged in the record groove, sound reproducing means connected to the pickup member, reversing switch means mounted on the respective end portions of said guide sleeve, said switch means being connected in circuit with said motor and source and being formed and arranged to be operated responsive to engagement of the pickup member therewith at the ends of the record, whereby to reverse the direction of rotation of the record, a plurality of keys pivoted to said support, a plurality of inclined discharge chutes on said support aligned with the keys, each chute being associated with a specific alphabet letter or word and key, a common receiving trough on the support subjacent the lower ends of the discharge chutes, a pair of gate members pivotally mounted on the support adjacent each chute and having means normally obstructing the lower end of the chute, means operatively connecting one gate member of each chute to its associated key and being formed and arranged to move the gate member to non-obstructing position responsive to depression of the key, a cam element on the pickup member, and follower means on the other gate members cammingly engageable with the cam element and being formed and arranged to move the other gate members respectively to non-obstructing positions when the stylus element is engaged in the portions of the record groove carrying the sound records corresponding to the alphabet letters or words associated with the respective discharge chutes.

5. In an alphabet and word teaching device, a support, a cylindrical phonograph record rotatably mounted on said support and having a helical record groove impressed with sound recordings of various alphabet letters or words, drive means formed and arranged to rotate the cylindrical record, a guide sleeve mounted on the support parallel and adjacent to said record, a phonograph pickup member slidably mounted on said guide sleeve and having a stylus element engaged in the record groove, sound reproducing means connected to the pickup member, a plurality of movable keys movably mounted on said support, a plurality of inclined discharge chutes on said support, each chute being associated with a specific alphabet letter or word and key, a common receiving trough on the support subjacent the lower ends of the discharge chutes, a pair of gate members pivotally mounted on the support adjacent each chute and having means normally obstructing the lower end of the chute, means operatively connecting one gate member of each chute to its associated key and being formed and arranged to move the gate member to non-obstructing position responsive to depression of the key, and cooperating means on the pickup member and the other gate members formed and arranged to move the other gate members respectively to non-obstructing position when the stylus element is engaged in the portions of the record groove carrying the sound records corresponding to the alphabet letters or words assosiated with the respective discharge chutes.

References Cited in the file of this patent

UNITED STATES PATENTS

| | | |
|---|---|---|
| 479,534 | Snaman | July 26, 1892 |
| 958,781 | Spencer | May 24, 1910 |
| 1,385,356 | Bates | July 26, 1921 |
| 1,930,286 | Runyan | Oct. 10, 1933 |